UNITED STATES PATENT OFFICE.

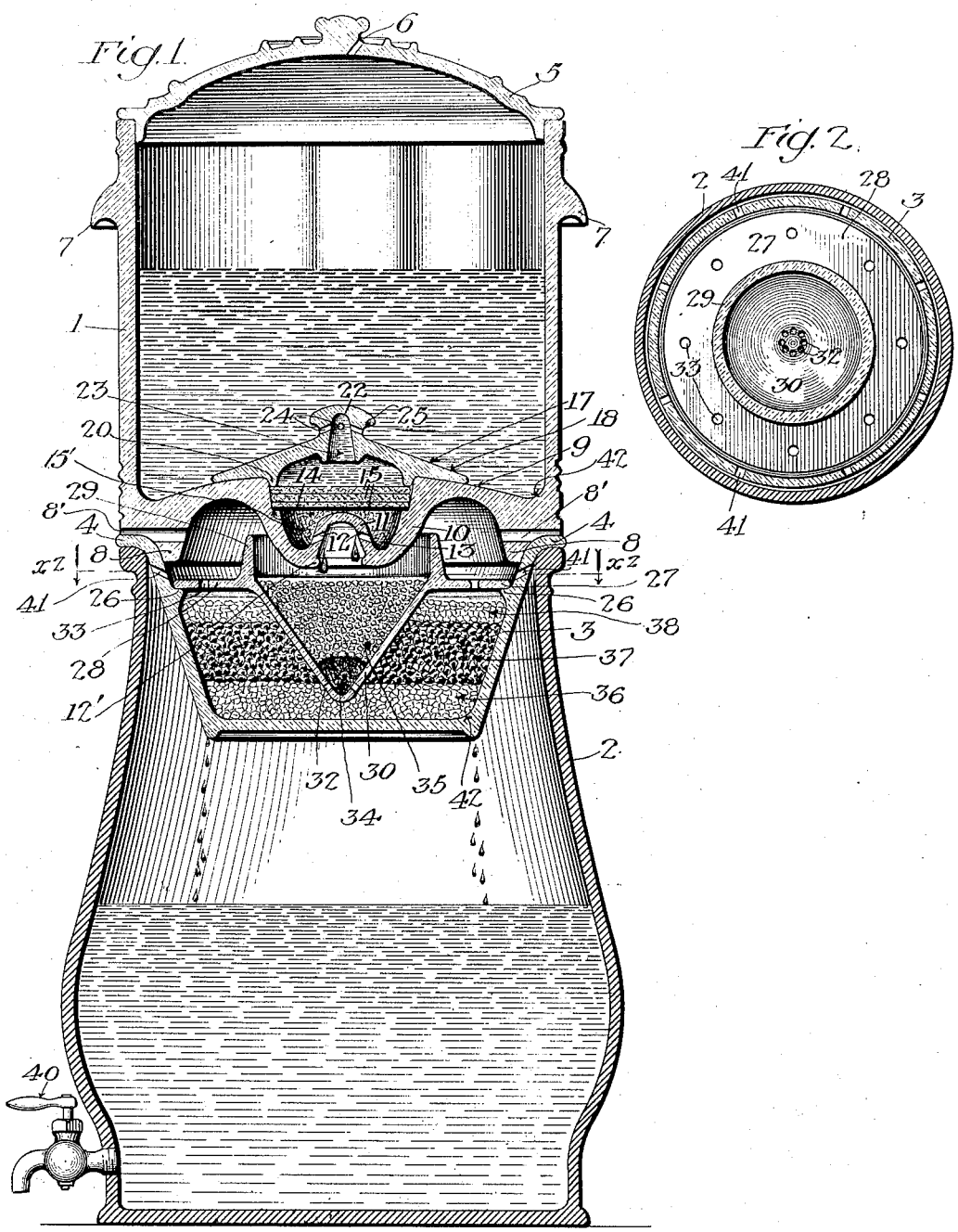

VIRGIL B. HAGG, OF LOS ANGELES, CALIFORNIA.

WATER-FILTER.

967,905.  Specification of Letters Patent.  Patented Aug. 23, 1910.

Application filed March 26, 1910. Serial No. 551,787.

*To all whom it may concern:*

Be it known that I, VIRGIL B. HAGG, a citizen of the United States, residing at Los Angeles, in the county of Los Angeles and State of California, have invented a new and useful Water-Filter, of which the following is a specification.

This invention relates to the class of filters known as portable or domestic water filters, that filter by gravity, and the main object of my invention is to retard or arrest suspended impurities held in the unfiltered water before the water comes in contact with the filtering medium, thereby preventing the filtering medium from clogging up with impurities, which would soon render the medium unfit for use.

A further object of the invention is to cause the water to filter upward at the final filtering process, for the reason that the water in filtering slowly upward will leave behind small particles of filtering medium that will spontaneously settle by gravity, that would otherwise be carried into the filtered water reservoir as in the case with the class of filters using downward filtration and granulated filtering mediums, such as charcoal, quartz, silica, etc.

Other objects of the invention will appear hereinafter.

The accompanying drawings illustrate the invention, and referring thereto:

Figure 1 is a vertical section of the filter. Fig. 2 is a horizontal section on the line $x^2$—$x^2$ Fig. 1.

The filter comprises a receptacle or container 1 for the water to be filtered, a receiver 2 for the filtered water, and a filter member 3 inserted between the members 1 and 2, said filter member 3 having an outwardly extending flange 4 resting on top of the member 2 and serving as a support for the bottom of the member 1.

The water receptacle 1 may be of cylindrical form and of suitable material such as glazed earthenware and provided with a removable cover 5 to enable the same to be filled, said cover having a vent 6 in its top. The receptacle 1 may be further provided with handles 7. The bottom of the receptacle 1 is formed with an annular depending flange 8 near its outer edge, and with opposite perforations 8' through said flange, said bottom extending upwardly so as to be convex on top and concave beneath, the convex elevated portion at the center of the bottom being provided with a depression or bowl 10 in the form of an inverted dome. At the center of this bowl there is provided an upwardly extending bottom portion in the form of a smaller dome 11 provided with ducts 12 in the walls thereof, said ducts extending inwardly and upwardly from the annular channel 13 between the inner and outer domes and opening into the space within the inner dome. Said bowl or outer dome 10 is packed with loose fibrous material indicated at 15' and is provided with a shoulder 14 on which rests a stack of sheets 15 of asbestos or other suitable porous material and a removable sediment diverting member 17 is provided in the form of a hollow cone having peripheral flange portions 18 resting and fitting on the convex elevation 9 and a depending flange 20 fitting within the upper part of the bowl 10. Said cone 17 is provided with a central handle 22 formed as a knob having eaves 25 and provided with a recess 23 extending upwardly from the bottom of said cone and communicating with the inner ends of ducts 24 extending outwardly and downwardly to communicate with the interior of the water receptacle 1.

The filter member 3 is formed as an inverted frusto-conical member, with its upper portion fitting around the depending flange 8 on the water receptacle and provided with a shoulder 26 near its top for support of a filter cup 27, comprising a horizontal flange portion 28 resting on said shoulder, an upwardly extending cylindrical flange portion 29 partially surrounding the bowl 10 and an inverted cone or funnel portion 30 extending down within the hollow member 3, said conical portion 30 being provided with upwardly and downwardly extending perforations 32, and the horizontal flange portion 28 being provided with perforations 33. The top of flange 29 surrounds the bowl 10 of the tank 1. Mineral wool, indicated at 34 is placed in the lower part of the conical portion 30 and a filter medium, consisting, for example, of bone carbon and silica may be placed thereon, as indicated at 35. The outer filter member 3 is provided with a layer of quartz, indicated at 36 to and above the level of the perforations 32, charcoal, indicated at 37, being placed thereon, with a top layer of quartz, indicated at 38. Receptacle 1 and the retainer 3 for the filtering medium are rounded at all the corners or junctions of the faces, as indicated at 42, to prevent dirt from sticking in such places and enabling the parts to be readily washed clean.

The receiver 2 for the filtered water may consist of the usual porous ware and may be provided with a drawoff faucet 40.

After the tank 1 has been filled and all agitation of the unfiltered water has ceased, the suspended matter gradually settles upon the removable cone 17 and the bottom of the tank 1, and the clear water passes upwardly through the ducts 24 into the recess 23 in the said cone member and into the space above the filtering medium 15. The projecting eaves 25 prevent the upwardly extending discharge duct 24 from clogging up with sediment as well as serving to form the knob or handle 22 for the removal of the cone member 17. The water filters slowly through the filtering material 15, this slow flow of the water preventing any suction of suspended matter through the upwardly extending discharge ducts 24. This slow flow of the water is due to the retardation of the water by reason of the interposition of the filtering medium between the inlet ducts and the outlet of the inclosing means for the filtering medium, said inclosing means consisting of the bowl 10 and the member 17. The inlet ducts 24 may, therefore, be made of considerable dimensions so that they are not liable to be clogged by the sediment, constriction by said ducts not being depended upon for retardation of the flow of liquid, such retardation being effected by the filtering medium. After the water has passed through the filtering material 15 it gradually rises through the second series of upwardly discharging ducts 12 located in the inner dome 11, the purpose of said dome being to provide means for the upward discharge of the water through said ducts and to equalize the distribution of water from the projecting base 12' thereof. The water drips from the distributing base 12' into the cone shaped inverted filter cup 30, where chemical action takes place relieving the water of injurious gases and impurities, and the water then passes out from said filter cup through the series of holes 32 which allow the water to escape and spread out where it is further purified in its upward course through the filtering material 37 which is retained by the member 3, the water passing upwardly through openings 33 and then through discharge ducts 41 near the top of said filter member. It will be understood by reference to Fig. 1 that the weight of water falling into the filter cup 30 will cause the water that has escaped through the holes 32, to rise to its own level through the filtering material 37 and to flow out through the ducts 41, as stated, dripping from the outside of said filter member 3 into the receiver or container 2 for the filtered water.

The perforated flange 28 on the filter cup 30 centers said filter cup and provides a suitable cover for the filtering material 37, and at the same time said flange serves as a retaining plate for finely divided particles of filtering material that would otherwise be disturbed.

The purpose of holes 8' is to introduce oxygen, which aerates with the water as the water drops from the bottom of the inner dome into the filter cup. The circulation of oxygen is effected by the two holes 8', one on either side of the bottom rim of the tank 1, which produces a draft whereby oxygen is introduced into the water and is carried down into the carbon where chemical action takes place and deleterious gases and odors are consumed or removed by the action of the oxygen, contained in the carbon, on the deleterious gases in contact therewith, the carbon operating in well known manner, when in contact with the gases and air, to facilitate oxidation of said gases and deodorization of the water. This oxygen supplied as above described has a tendency to prolong the chemical action of the carbon, as the action of carbon depends on the oxygen held within its pores.

What I claim is:

1. In a water filter, a water receptacle having a bowl-shaped portion in its bottom, and a removable cone member fitting over said bowl shaped portion and provided with upwardly extending perforations communicating with the interior of the cone.

2. A water filter comprising a water receptacle having a bottom portion formed with a bowl, said bowl having upwardly extending discharge outlets, and a removable cone member fitting on said bottom over said bowl and having an internal recess and provided with ducts extending upwardly from the outside of the cone into said recess, and filtering medium in said bowl between said ducts and said outlets from the bowl.

3. A water filter comprising a water receptacle having a bottom portion formed with a bowl, said bowl having a dome in its bottom provided with upwardly extending discharge outlets, and a removable cone member fitting on said bottom over said bowl and having an internal recess and provided with ducts extending upwardly from the outside of the cone into said recess, and filtering medium in said bowl between said ducts and said outlets from the bowl.

4. In a water filter, a retainer for filtering medium having upwardly extending outlet ducts in the upper portion and containing filtering material, and a filter cup extending within said retainer and provided with a depending portion extending downwardly thereinto below said filtering medium therein and provided with outlet ducts in its lower portion below said filtering medium.

5. In a water filter, a retainer for filtering medium having upwardly extending outlet ducts in the upper portion and containing filtering material, and a filter cup extending within said retainer and provided with a depending portion extending downwardly thereinto below said filtering medium therein and provided with outlet ducts in its lower portion below said filtering medium, and filtering medium contained within said filter cup.

In testimony whereof, I have hereunto set my hand at Los Angeles, California, this 21st day of March, 1910

VIRGIL B. HAGG.

In presence of—
ARTHUR P. KNIGHT,
FRANK L. A. GRAHAM.